H. R. KLARE AND A. H. GROSZ.
AUTOMOBILE WHEEL ATTACHMENT.
APPLICATION FILED NOV. 27, 1920.
1,372,958. Patented Mar. 29, 1921.
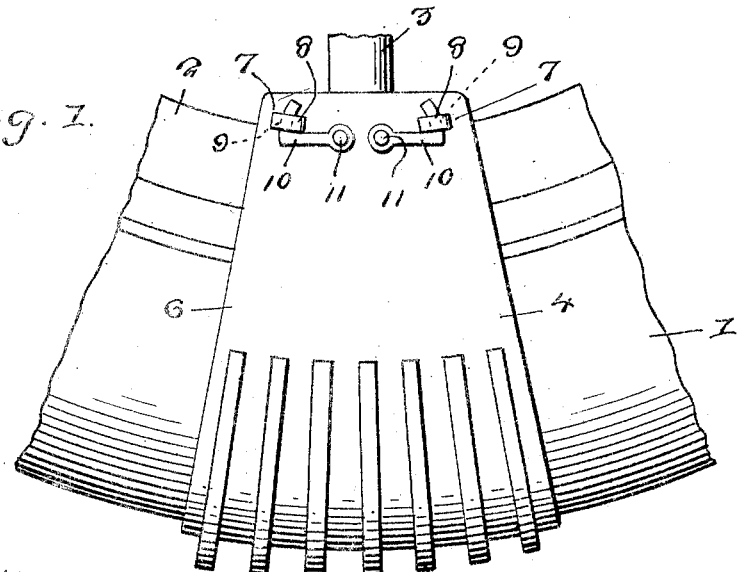
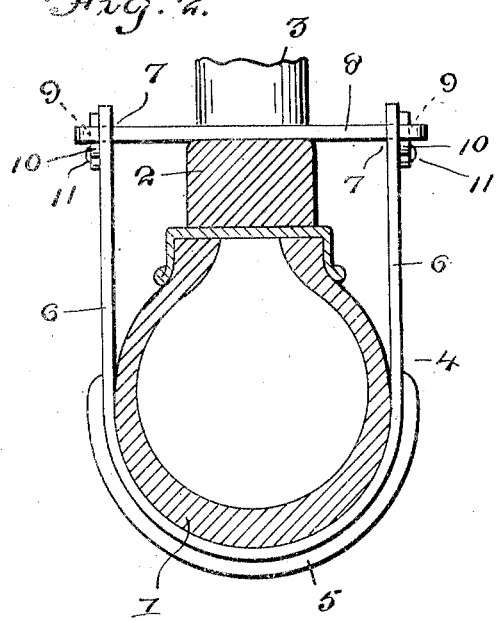
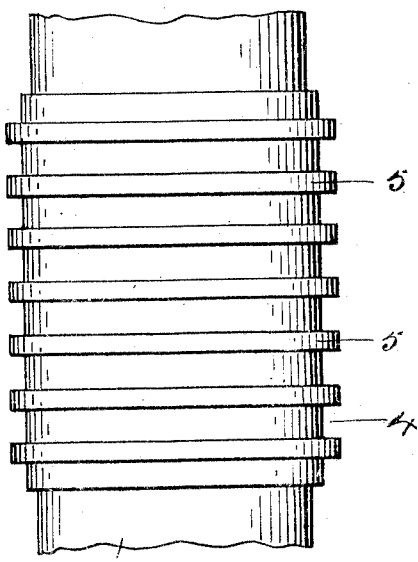

UNITED STATES PATENT OFFICE.

HENRY R. KLARE AND ADAM H. GROSZ, OF NEW ORLEANS, LOUISIANA.

AUTOMOBILE-WHEEL ATTACHMENT.

1,372,958.   Specification of Letters Patent.   Patented Mar. 29, 1921.

Application filed November 27, 1920. Serial No. 426,721.

*To all whom it may concern:*

Be it known that we, HENRY R. KLARE and ADAM H. GROSZ, citizens of the United States, residing at New Orleans, in the county of Orleans and State of Louisiana, have invented new and useful Improvements in Automobile-Wheel Attachments, of which the following is a specification.

The object of our present invention is the provision of a simple, inexpensive, and easily applied automobile wheel attachment, calculated to impart to a wheel the capacity of extricating itself promptly from mud holes, ruts and soft depressions in roads.

To the attainment of the foregoing, the invention consists in the improvement as hereinafter described and definitely claimed.

In the accompanying drawings, forming part hereof:

Figure 1 is a view showing our novel attachment as properly applied to a portion of an automobile wheel.

Fig. 2 is a transverse section of the same.

Fig. 3 is a view showing the tread portion of the attachment body in plan.

Similar numerals of reference designate corresponding parts in all of the views of the drawings.

The automobile wheel includes a tire 1, a felly 2, and a spoke 3 and is otherwise of the ordinary well known construction.

Among other elements our novel attachment comprises a U-shaped body 4 which is preferably of cast metal and is made quite heavy so as to withstand hard usage. The said body 4 is adapted to be arranged in straddling relation on the tire and felly as best shown in Fig. 2; and it is characterized by a transversely ribbed or corrugated tread portion 5 and by side portions 6 in which are apertures 7.

In addition to the body 4 the attachment comprises cross bars 8, detachably connected to the side portion 6 of the body and adapted to be arranged at opposite sides of a spoke of the wheel. It is desirable to quickly and easily disconnect the cross bars 8 from the side portions 6 of the body, and therefore we prefer to employ the construction best shown in Fig. 1 for the connection of the bars 8 to the body portions 6. According to the said construction the outwardly extended end portions of the bars 8 are provided with apertures 9, and hooks 10 are pivoted at 11 to the outer sides of the portions 6 and are adapted to be swung into and out of the apertures 9. Manifestly when the hooks 10 are positioned as shown in Fig. 1 the bars 8 will be securely though detachably connected to the body. When, however, the hooks 10 are swung out of the said apertures 9, the bars 8 may be slipped endwise out of engagement with the side portions 6 so as to permit of the body 4 being readily disassociated from the tire and the felly.

It will be apparent from the foregoing that our novel attachment is susceptible of quick and easy application to an automobile wheel; also, that when the attachment is applied as shown in Figs. 1, 2 and 3 it will lend to the wheel the ability to extricate itself from a mud hole or any other soft depression in a road. This will be better understood when it is stated that when the wheel is powerfully turned, the attachment body will take secure hold of the ground and will afford ample traction for the extrication of the wheel from a soft depression or from any other depression of considerable depth.

Having described our invention, what we claim and desire to secure by Letters-Patent, is:—

An automobile wheel attachment comprising a U-shaped body adapted to be arranged in straddling relation on a wheel tire and felly and having a transversely-ribbed tread portion and also having side portions with transverse apertures, transverse bars extending between said side portions and removably arranged in and extending outwardly beyond said apertures and adapted to rest at opposite sides of a spoke of a wheel and having apertures in their extended portions, and hooks pivoted to the side portions of the body and arranged to enter said apertures of the transverse bars and detachably fasten the bars to the body.

In testimony whereof, we affix our signatures.

HENRY R. KLARE.
ADAM H. GROSZ.